United States Patent

[11] 3,623,466

[72] Inventor William F. Palmer
Lowell Road, Carlisle, Mass. 01741
[21] Appl. No. 853,586
[22] Filed Aug. 6, 1969
[45] Patented Nov. 30, 1971
Continuation of application Ser. No. 707,000, Jan. 19, 1968, which is a continuation of application Ser. No. 501,436, Oct. 22, 1965. This application Aug. 6, 1969, Ser. No. 853,586

[54] CURRENT TRANSFER ELECTRICAL SYSTEM
4 Claims, 11 Drawing Figs.
[52] U.S. Cl. .................................................. 123/148,
315/209
[51] Int. Cl. .................................................. F02p 3/06
[50] Field of Search .................................... 123/148 E;
315/209, 209 CD, 214

[56] References Cited
UNITED STATES PATENTS
3,049,642  8/1962  Quinn ....................... 315/209 CD
3,297,911  1/1967  Quinn ....................... 315/214
3,357,415  12/1967 Huntzinger ................. 123/148 E
3,366,098  1/1968  Palmer ...................... 123/148 E
3,367,314  2/1968  Hirosawa et al. ........... 123/148 E Primary Examiner—Laurence M. Goodridge
Attorney—Edgar O. Rost ABSTRACT: An electrical switching circuit utilizing transistorized components in contact controlled high voltage pulse generation which is applied to a high-ratio transformer through a diode which prevents reverse current. A parallel inductance provides for storage of energy pulses is incorporated directly with the transistor amplifier circuit. In addition a capacitor is connected in parallel across the output of the diode and a silicon controlled rectifier may be serially connected between the capacitor and step-up transformer to provide a capacitor-discharge or high voltage converter. A half-wave as well as full wave contact controlled DC converter together with trigger pulse delay means and any combination thereof using the inductive energy storage principles are disclosed.

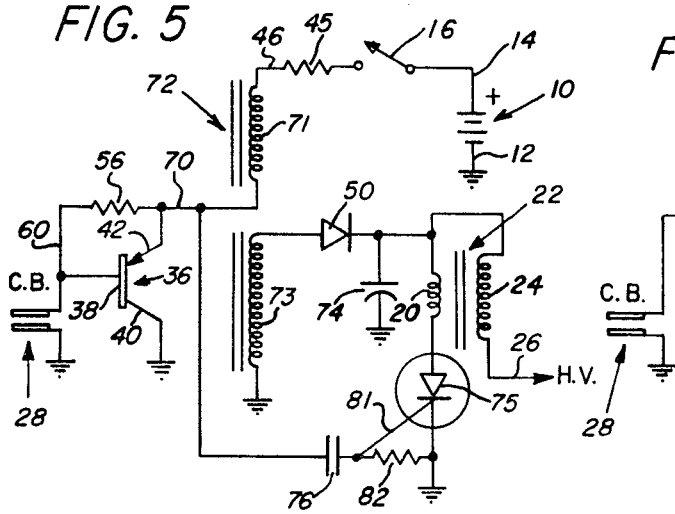
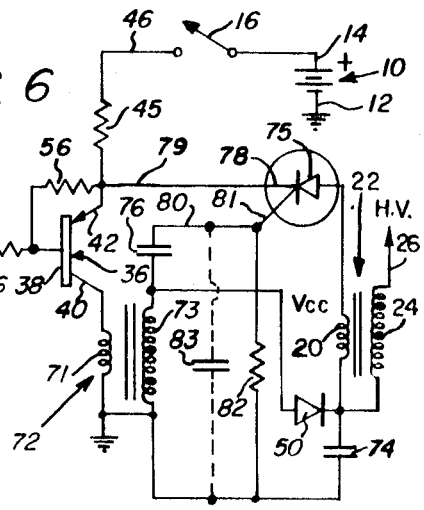
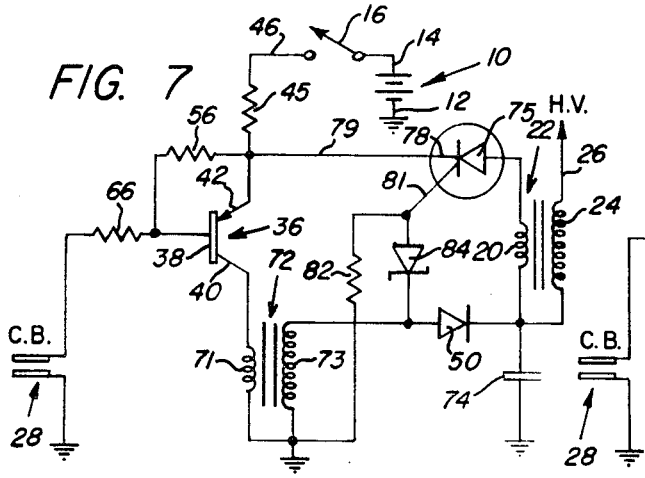
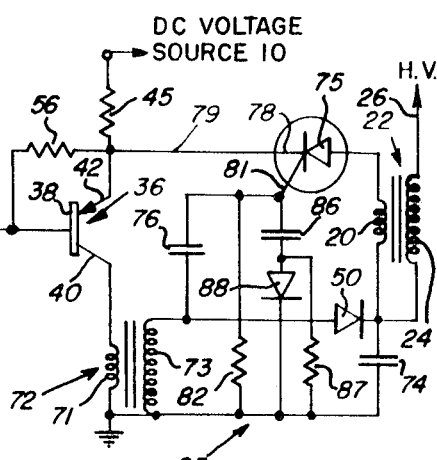
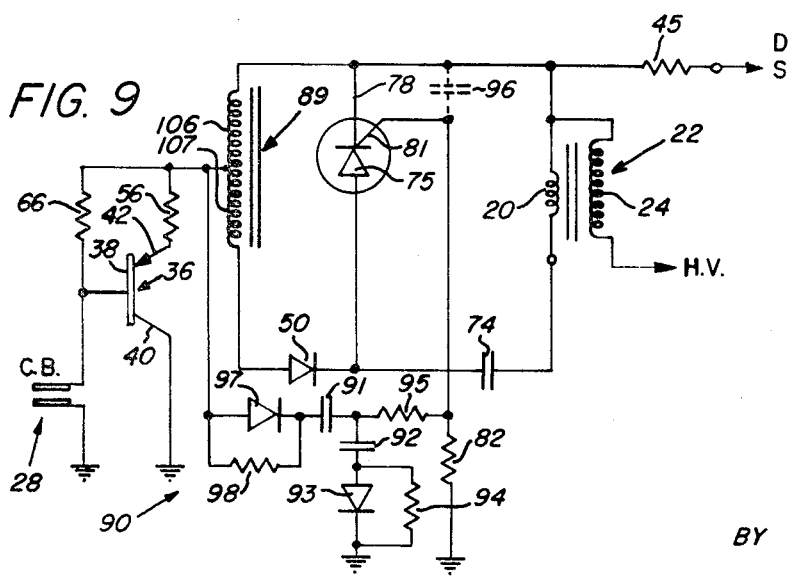

INVENTOR
WILLIAM F. PALMER
BY
ATTORNEY

CURRENT TRANSFER ELECTRICAL SYSTEM

CROSS-REFERENCE TO COPENDING APPLICATIONS

The present invention is a continuation of my copending application, Ser. No. 707,000 filed 1-19-68 which is a continuation-in-part of Ser. No. 501,436 filed Oct. 22, 1965.

The well-known ignition circuit in conventional battery operated combustion engines utilizes a transformer coil, a condenser and mechanical circuit breaker contacts coupled to some mechanical moving means to conductively connect the inductive load to the direct current power source. Upon interruption of the current flow a large inductive voltage is generated in the secondary windings which in turn fires the spark plugs. The contacts therefore effectively function as a make-and-break switch in the primary circuit of the ignition coil. It is required that they carry currents in the order of 5 to 10 amperes when closed and withstand several hundred volts of coil "kickback" voltage when they open and thereby break the circuit. The high current density and substantial voltages across the breaker contacts result in oxidation, erosion, burning, and pitting which requires frequent maintenance and replacement to continue efficient performance of the ignition circuit. Due to the higher speed of the modern day multicylinder engines the time period when the contacts are closed is relatively short and the current build up does not reach full value before the points open again. The output voltage begins to achieve only a fraction of its full capability.

In recent years considerable interest has been shown in electrical circuits utilizing transistor amplifiers to carry the high current and isolate the "kickback" voltage from the breaker contacts which now handle only a small signal current to bias the transistor in the conductive state and a relatively low voltage in their nonconductive state. Such transistor systems commonly incorporate the transformer primary in the emitter or collector circuit and the circuit breaker contacts are conductively connected to the base electrode. The transistor therefore entirely controls the current flow from the voltage source to the transformer primary and the contacts merely switch the transistor on and off. The use of the transistor has led to faster current build up with little peak current fall-off at higher engine speeds. Additionally the contacts have been proven to be relatively free of the disadvantages arising in conventional electrical ignition circuits.

One of the necessary requirements, however in prior art transistorized ignition systems has been the need for a specially designed low primary inductance coil to cope with the voltage rating of commercially available transistor amplifiers. Conventional ratio ignition coils having a value of between 70 and 90:1 must therefore be replaced by one having a ratio of approximately 250 to 400:1 in order that the transistor voltage ratings are not exceeded. In practice then special high ratio transformer coils will be more expensive than the conventional standard ratio coil. Difficulties in education of qualified service personnel and occasional transistor failures have also hindered wider acceptance of transistorized circuits in ignition systems.

Several suggested protective circuits have therefore evolved in the art in an attempt to incorporate the advantages of transistorized operation together with standard conventional ratio coil transformers. One such teaching incorporates the use of the so-called series stacking technique employing lower voltage transistor amplifiers or expensive high voltage transistors in order to withstand the 200 volts or more of primary "kickback". Other such systems employ inversion or rectification to obtain DC voltage across an energy storage condenser which in turn is discharged into the transformer primary to result in a capacitive discharge circuit for the production of the high-voltage secondary energizing pulse. Such circuits can further complicate matters in that complexities are introduced as well as additional expense which fails to meet the first test or requirement for a simplified circuit means for the conversion of present ignition system circuits to the full utilization of transistor operation. In addition, such complex circuitry often fails to provide the appropriate high speed response or eliminate the high speed roll off of the output voltage.

The primary object of the present invention is the provision of a novel electrical ignition circuit.

A further object of the present invention is the provision of a novel transistorized ignition system for automotive applications.

A still further object of the invention is the provision of a current transfer means utilizing a conventional ratio ignition transformer or coil to generate the high voltage pulse.

An additional object of the present invention is the provision of a novel transistorized ignition system adapted for use in internal combustion engines to provide for improved circuit breaker contact life without extensive or costly modifications of existing electrical circuit components now utilized in such systems.

Broadly stated, the invention envisages the incorporation in an electrical ignition system of a transistor current amplifier and a shunt inductance in parallel with the primary winding of the conventional ratio ignition transformer or coil with the base of transistor controlled by the pulse generation means such as the circuit breaker contacts. Any suitable inductance such as a choke coil or transformer may be utilized in the practice of the invention. Upon closure of the contacts the inductor is energized by the direct current voltage source since the transistor is in the conductive state. Opening of the contacts results in interruption of current flow in the transistor and transfer of energy to the primary winding of the conventional step-up power transformer or coil. This reversing or bucking current flows immediately into the primary winding of the step-up transformer and leads to an induced voltage in the secondary winding in much the same manner as the conventional interruption of current induces high voltage pulses. The main feature of the invention therefore is the direct control of the transistor amplifier by the pulse generation means together with the energizing of the parallel inductance for the storage of what may be referred to as an "arresting" current which becomes the energy source to the primary winding of a step-up transformer upon the opening of said means. A departure from prior art transistorized electronic ignition systems is noted wherein the transistor was tied only to the primary winding during conduction with the contacts closed. In some instances elaborate circuits have been designed involving plural transistor amplifiers with one transistor in the conductive state while the pulse generation means are closed and another transistor is sequentially energized after the first transistor is nonconductive. The present invention seeks to eliminate all superfluous circuitry and provide for a speedy and less expensive retrofit package to incorporate the advantages of transistor operation in present day ignition system with operation under both systems still permissible should transistor failure arise during operation.

The flow of current during the period of energy storage in the parallel inductance means may be effectively isolated from the conventional step-up power transformer by unidirectional current biasing means to prevent the flow of current into the primary winding of the conventional ratio transformer. Such isolation means include diode rectifiers, four layer diodes or silicon controlled rectifiers with suitable gating circuits. Numerous embodiments of a parallel inductance circuit arrangement will be described for various electrical ignition systems.

Other objects, features and advantages will be evident after consideration of the following detailed specification and reference to the accompanying drawings in which:

FIG. 5 is a schematic circuit diagram of the embodiment of the invention incorporating a capacitor and switching device;

FIG. 6 is a schematic circuit diagram incorporating reverse bias means on the switching device and a gate pulse divider;

FIG. 7 is a schematic circuit diagram with zener diode trigger pulse delay means;

FIG. 8 is a schematic circuit diagram of the embodiment of the invention with attenuation provided by a capacitive divider for DC blocking;

FIG. 9 is a schematic-circuit diagram of a half-wave rectifier system with an autotransformer and momentary capacitive attenuation;

Figures 1, 2:
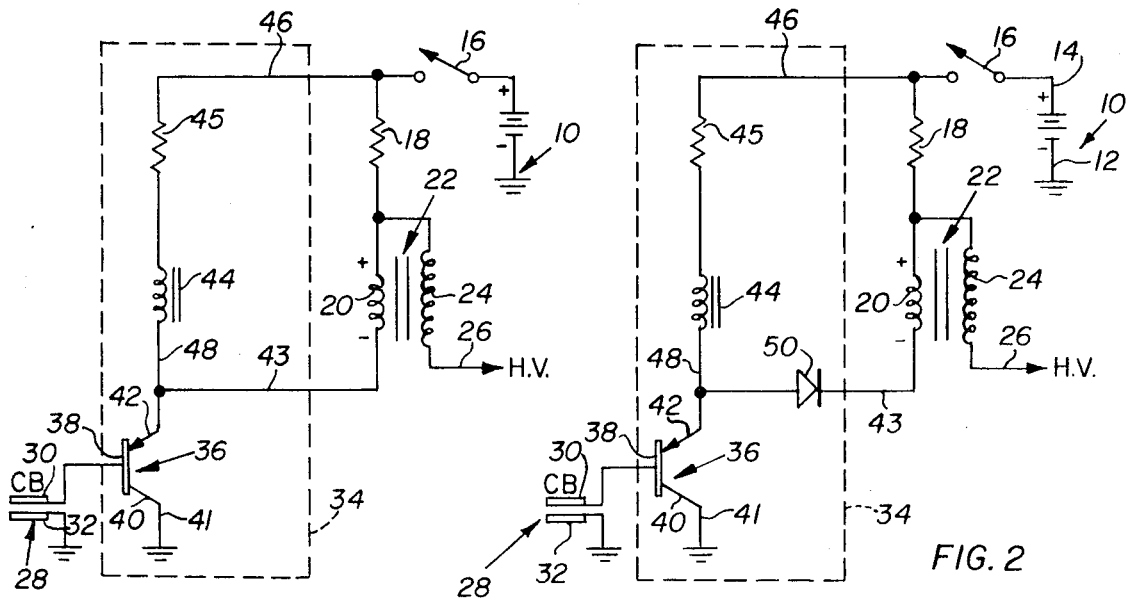
FIG. 1 is a schematic circuit diagram of an exemplary embodiment of the invention.
FIG. 2 is a schematic circuit diagram of a modified embodiment of the invention.

Referring to the drawing there is shown in FIG. 1 an exemplary circuit of the invention. A direct current source 10, which may have a value of 6 or 12 volts in present day automotive equipment, powers the circuit. The negative terminal 12 is grounded and the positive terminal 14 is connected to one pole of ignition switch 16. While a negatively grounded system has been illustrated, it is understood that with appropriate modifications, for example the use of an NPN-transistor amplifier instead of the PNP-type or a phase inverter stage, the invention may be equally applicable to positively grounded systems. In nonautomotive applications, the grounding may be immaterial.

The other pole of switch 16 is conductively connected through a current limiting resistor 18 to the primary winding 20 of step-up transformer or ignition coil 22. The secondary winding 24 provides for the induced high voltage for application to the conventional spark plug load through the distributor by means of lead 26. For the purposes of this specification details of the high voltage distribution system have been omitted as unnecessary to an understanding of the invention and the symbol H. V. collectively refers to any high voltage load.

The transformer 20 will have the conventional high primary inductance and low turns ratio in the range of approximately 70 to 90:1 since this invention is to be practiced in present ignition systems in a retrofit manner without any transformer modifications necessary. In the present state of the art applicable to transistorized ignition systems the much lower primary inductance and high turns ratio in the 250 to 400:1 range is required to reduce the "kickback" voltage across the transistor amplifier.

In the conventional ignition system, pulse generation means 28 of the circuit breaker type are employed having contacts 30 and 32 grounded on one side to complete the primary ignition circuit along with a condenser (not shown) across the contacts to assist in reducing arcing. The operation of the conventional system is as follows: With switch 16 closed the contacts assume a make-and-break function. Upon closure of contacts 30 and 32 the primary ignition circuit loop is completed and current flows from the direct-current source 10 through the primary winding until the Ohm's law value is achieved. Upon contact opening the circuit is sharply interrupted and the abrupt reduction in current flow induces a high voltage for ignition in the secondary of the transformer in accordance with the well known principles of induction. The abrupt change which has developed is from current out of primary 20 to zero and at high engine speeds when contact closure time is of short duration the ignition spark may cut out as much as 30 percent of the time in the 3,000–5,000 r.p.m. region.

In accordance with the teachings of the invention the only components necessary to improve over all ignition efficiency at a minimal cost are shown within the area outlined by dotted line 34. A transistor power amplifier device 36 having a high voltage rating is serially connected to the circuit breaker contacts and primary winding loop with base 38 connected to the contacts and collector 40 grounded by conductor 41. While the grounded collector circuit configuration has been illustrated, the grounded emitter circuit may also be employed. Emitter 42 in the present case therefore will be connected by conductor 43 to one end of primary winding 20. Control of the transistor amplifier conductivity will be direct through the pulse generation means 28.

A shunt circuit loop comprising inductance 44 and resistor 45 is connected by conductors 46 and 48 between the emitter 42 and switch 16. Inductance 44 will be in parallel with the primary inductance winding 20 of transformer 22 and may comprise a simple energy storage choke coil or transformer. In the illustrative embodiment a matching ratio of approximately 1:1 between the parallel inductance 44 and primary inductance 20 is under consideration and to assist in a rapid "charging time" at modern day high engine speeds it is preferred that the choke coil or transformer have a slightly lower inductance value rating than the 6 millihenries, which is approximately the standard transformer primary inductance rating.

In the new circuit arrangement, upon closure of the circuit breaker contacts the emitter electrode is heavily positively biased with respect to the negatively biased base. With the collector 40 at ground potential the transistor 36 is now conductive and current ($I_1$) builds up rapidly in the circuit loop 44, 45, 46 and 48 to the Ohm's law value. Simultaneously with the build up of current ($I_1$) in the shunt inductance circuit loop, direct current ($I_2$) also flows in the primary inductance circuit 18 and 20 of a value substantially equal to that of the current in the first-named circuit loop. Hence, under normal conditions a current of 4 to 5 amperes flows in each parallel circuit loop. The total power source would therefore by the sum of ($I_1$) and ($I_2$) or approximately 8 to 10 amperes. This value seems tolerable in modern automotive equipment. It may be preferred in some instances for the current ($I_1$) to exceed ($I_2$) and establish a small opposite or reverse polarity flow.

Immediately upon contact opening transistor 36 becomes nonconductive and tends to cut off current flow in both inductance 44 and primary inductance winding 20. If both currents had been equal prior to transistor cut off, they will (ignoring transient effects) both be arrested by their induced voltage across the transistor. If one of the currents were greater than the other a reverse current is established in the loop having the smaller current.

Referring to FIG. 2 a modification of the embodiment shown in FIG. 1 is disclosed. In this view as in the following views a specification similar components have been assigned the same reference numeral as in FIG. 1. Unidirectional current rectifier means 50 may be provided in series to isolate the primary inductance winding so that no current flows from the energy storage inductance 44 until the desired time for the transfer of current to generate the high voltage pulse. A diode rectifier has been illustrated however other components may include silicon controlled rectifiers with a gating circuit or a four layer diode. In this circuit as in FIG. 1 when the circuit breaker contacts close the transistor amplifier 36 is conductive. The unidirectional means 50 connected in conductor 43 is reverse or off biased when current flows in the parallel inductance 44, 45, 46 and 48 and as a result no current is permitted to flow in the primary inductance winding 20. Upon opening of the contacts the transistor 36 is abruptly cut off and this current induces a positive-going potential at its lower end of winding 20 which in turn renders the diode conductive causing the stored energy to flow between inductance 44 and primary of transformer 22. This pulse of current in the primary induction and the reflection of the secondary will be opposed by the voltage induced by the changing current. This voltage is multiplied by the transformer turns ratio at the high voltage output terminal and if we assume a current of 4 to 5 amperes flowing initially in the parallel inductance loop the result will be the same as if a primary 20 had a 4 to 5 ampere current interrupted to thereby induce a high secondary voltage pulse. With this modification the total power source drain may be effectively reduced and at the same time gaining the improved frequency or speed response capable in transistor ignition systems while employing the conventional ignition power transformer or coil.

Figures 3, 4:
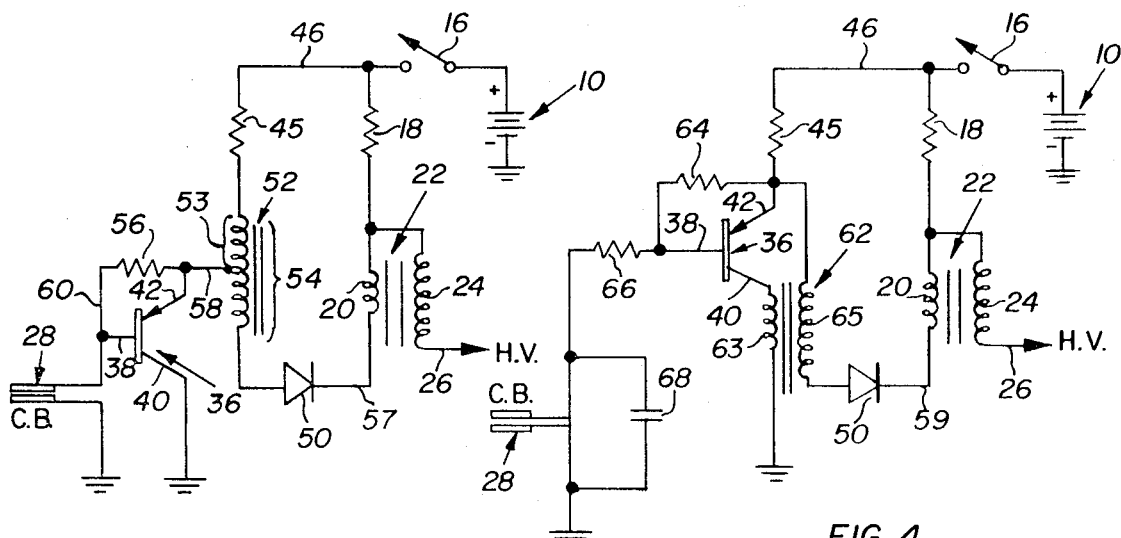
FIG. 3 is a schematic circuit diagram of an alternative embodiment of the invention utilizing an autotransformer as the parallel inductance.
FIG. 4 is a schematic circuit diagram of an other alternative embodiment utilizing an isolation transformer and other modifications of the circuits shown in FIGS. 1, 2 and 3.

In the preceding circuit configurations a matching ratio of 1:1 is disclosed which requires the use of transistor amplifiers having higher voltage ratings. An interesting modification will now be discussed which permits the use of transistors having lower voltage ratings and corresponding lower cost. In FIG. 3 a transformer 52 is shown which may for example have a ratio of 1:3. A tap 58 on transformer 52 is conductively connected to emitter 42 allowing section 53 to function as the primary. Base 38 is shunted by means of conductor 60 and resistor 56 to the tap 58. With the unidirectional biasing means 50 provided in conductor 57 the tap on the transformer primary is connected to ground through the transistor to thereby apply most of the power source voltage across the winding 53 of transformer 52 when the transistor is conductive and a voltage correspondingly higher by a factor of three in this example appears across the secondary 54 by induction when the pulse generation means 28 open and the transistor is nonconductive. With this arrangement it is possible to attain 200 volts across the primary winding 20 of ignition transformer 22 using transistor devices having ratings of between 60 to 80 volts.

When the contacts open the current ($I_1$) in the parallel inductance circuit, as in the previous illustrations with a protective or isolation diode, will now establish a current flow into the primary winding 20 and induce the high voltage pulse desired. Battery drain will be reduced with this circuit as well. In those applications without the reverse biased diode an interesting phenomenon is observed which may be referred to as a "boost" effect. During contact closure the current ($I_2$) flowing through the primary 20 of power transformer 22 will be approximately one-third that flowing in the parallel inductance or transformer 52 loop if resistance is suitably chosen. Hence, if 3 amperes is flowing in ($I_2$), 9 amperes are required in ($I_1$) to achieve a cancelling or bucking response. Upon contact opening the reversal of ($I_1$) results in an immediate return of transformer 22 to the battery end of resistor 45, instead of the transformer 52 and this "boost" effect results in a higher secondary voltage pulse in winding 24 or approximately 20-25 percent extra output efficiency.

Whereas in FIGS. 1, 2, and 3 the circuit is the grounded collector configuration and additional modification is shown in FIG. 4 which illustrates common emitter circuit. This configuration permits grounding of the primary 63 of an isolation transformer 62 while the secondary 65 is floating. An additional advantage resides in the retention of the conventional condenser 68 across the contacts 28. As a result with the insertion of a simple two-position switch either the conventional ignition system or the new transistorized system may be operated should maintenance or repair of any components be necessary. A diode 50 may be incorporated for improved isolation of transformer 62 from transformer 22 by means of conductor 59. A base current limiting resistor 66 is incorporated together with a resistor 64 between the base 38 and emitter 42.

The transformer 62 by means of grounding of the primary inductance permits the secondary to be returned to any point in the circuit at other DC voltage for highest efficiency. During the "on" time with the points closed the secondary voltage in transformer 62 adds to the reverse current when the transistor is nonconductive thereby increasing the current seen by the primary inductance 20 of the ignition transformer.

If the diode 50 is omitted the current flowing during on time through the primary winding 20 is added to the current in primary 63 of transformer 62. This provides the boost effects previously discussed for FIG. 3.

The use of the transients resulting on contact opening coupled with inductive energy storage for controlled pulse generation in the preceding circuits is applied to high-ratio transformers through a diode to prevent reverse current. A modification of this embodiment incorporates the addition of capacitor means in parallel across the output of the diode together with serially connected switching devices such as a silicon controlled rectifier and provides the elements of a capacitor discharge ignition system or a high voltage converter.

In FIG. 5 wherein similar components described in conjunction with FIGS. 1-4 inclusive have been similarly numbered, this principle is illustrated with the emitter follower or grounded collector transistor configuration. The emitter electrode 42 of transistor 36 is connected by means of lead 70 to the primary winding 71 of transformer 72 which has its output winding returned through conductor 46 to the preferred terminal of the power supply 10. Resistor 56 is connected between the base 38 and emitter electrode 42 as well as primary winding 71 by means of lead 60.

The secondary winding 73 of transformer 72 is connected through unidirectional diode 50 and lead 59 to the transformer 22 which provides the high voltage pulse. Storage capacitor 74 is connected in parallel across the output of diode 50. A silicon controlled rectifier (SCR) 75 is then serially connected between the primary 20 of transformer 22 and the capacitor 74. Another capacitor 76 is connected by gate lead 81 to control triggering of the SCR device 75 or other suitable controlled switching means.

In operation the circuit provides with contacts 28 closed for the flow of current in the primary 71-transistor 36 branch exponentially to the value limited only by the DC resistance. Upon contact opening the inductively stored energy generates a voltage pulse which is transformed to the desired voltage in the secondary 73 and passed by diode 50 to charge capacitor 74. The diode 50 then prevents the discharge and if the SCR device 75 is not triggered a high voltage exists across capacitor 74. Triggering of the SCR device connects the storage capacitor across the primary winding 20 of transformer 22 to yield the high voltage ignition pulse in the secondary 24 for conduction by lead 26 to the conventional spark plug load. With a value of several hundred volts across the capacitor 74 and a transformer turns ratio of 100:1 a pulse in the order of tens of kilovolts may be realized in the output.

The trigger capacitor 76 will desirably have a value selected to prevent gating of switch prematurely or, in the other words, to avoid gating before the voltage has risen in the storage capacitor 74 to a sufficient level to produce oscillatory reversal of the voltage across the SCR 75.

The situation thus described may be improved somewhat by returning the cathode 78 of SCR device 75 to the positive terminal 14 of supply 10 through lead 79, resistor 45, conductor 46 and ignition switch 16 as shown in FIG. 6. The gate lead of the SCR can thereby be reverse-biased by tying it to ground. A delay in triggering will allow capacitor 74 to be substantially charged before the SCR device 75 is gated on. Diode 50 now directly biases transformer 22 and a tap off from the secondary 73 of transformer 72 derives the triggering pulse through capacitor 76 and lead 80 to gate lead 81. Resistance 82 in the trigger circuit as well as capacitor 83 will produce a practical circuit if their values in relation to trigger capacitor 76 are such that a voltage greater than Vcc is generated at gate 81. At practical engine speeds this condition is attainable for internal combustion engine ignition systems.

FIG. 7 illustrates an alternative method of delaying triggering pulses on the switching device utilizing a Zener diode 84 in lieu of capacitor 76 and/or capacitor 83 where applicable. In certain instances it may also be preferred to install the Zener diode in series with capacitor 76. In this circuit the trigger pulse voltage must rise above the Zener breakdown voltage of diode 84 plus supply voltage Vcc before device 75 is triggered.

The cost of a Zener diode, as well as some possible high speed triggering problem, may impose some restrictions. Consequently, a temporary pulse attenuation circuit to function during the initial cycle or cycles to allow full charge of storage capacitor 76 is suggested in FIG. 8. A capacitive divider subcircuit which provides such attenuation is designated 85 and includes capacitor 86, resistor 87 and diode 88. The resistor 82 in this circuit acts to off-bias SCR device 75 with the cathode 78 tied to positive branch 14.

In operation the first cycle or cycles of contact closing and opening result in discharging of capacitor 86. Capacitors 76 and 86 form by reason of this circuit configuration a voltage divider designed to allow the storage capacitor to be charged to a moderate to high portion of total energy capacity before the gate voltage exceeds the cathode voltage and triggering occurs. The discharge of capacitor 86 occurs through diode 88 and with succeeding pulse cycles the attenuating action diminishes. Hence, the effect of the divider subcircuit 85 may be negligible at high rates of speed or after several initial cycles but does allow for full charging of capacitor 76 in a short time. Resistor 87 permits the discharging of capacitor 86 when the pulse generation system is turned off for even a few seconds to allow for restarting. Since capacitor 76 is connected to secondary 73, a lower voltage capacitor may be used if a tap on the secondary which provides several hundred volts is employed.

FIG. 9 illustrates an embodiment of the invention which offers considerable simplicity, low cost and ease in installation in retrofit of the new system in present day vehicles. Additionally, instant return to the standard automotive ignition system in case of emergency, such as the failure of the electronic system, is available with this circuit. The standard ballast 45 and ignition coil or high voltage transformer 22 used in conventional systems will be compatible with the half-wave rectifier circuit now to be described. Diode 50 again as in the previous embodiments delivers a positive pulse to charge storage capacitor 74 upon contact opening. The SCR device 75 is connected in parallel with transformer 22 instead of in series as in the previous illustration. A series loop including storage capacitor 74, SCR 75 and primary 20 is noted. Transformer 89 which is of the floating type similar to that shown in FIG. 3 is short-circuited during the time interval that device 75 is on. This condition however is of short time duration and causes negligible reduction of power efficiency since the secondary coil time constant is much greater than the duration of shorting.

The trigger pulse on gate lead 81 is provided from the lead to the emitter 42-primary winding tap of transformer 89. The trigger subcircuit 90 now includes capacitors 91 and 92 and diode 93 together with resistor 94 perform the attenuator function. Resistor 95 is utilized for gate current limiting and capacitor 96 may be used to improve immunity to noise pulses on the power line. Diode 97 and resistor 98 may also be utilized in high speed engines to improve immunity to contact bounce.

When the SCR 75 is gated on the storage capacitor 74 discharges through primary 20 producing the high voltage pulse in secondary 24. After completion of the cycle, the residual energy is recovered through diode 50 and transformer 89 when oscillation causes reversal of the voltage across the primary 20. This recovery current now adds to the normal current in transformer 89 which functions as a current transformer after contact opening with the primary current having been established upon contact.

Figure 10:
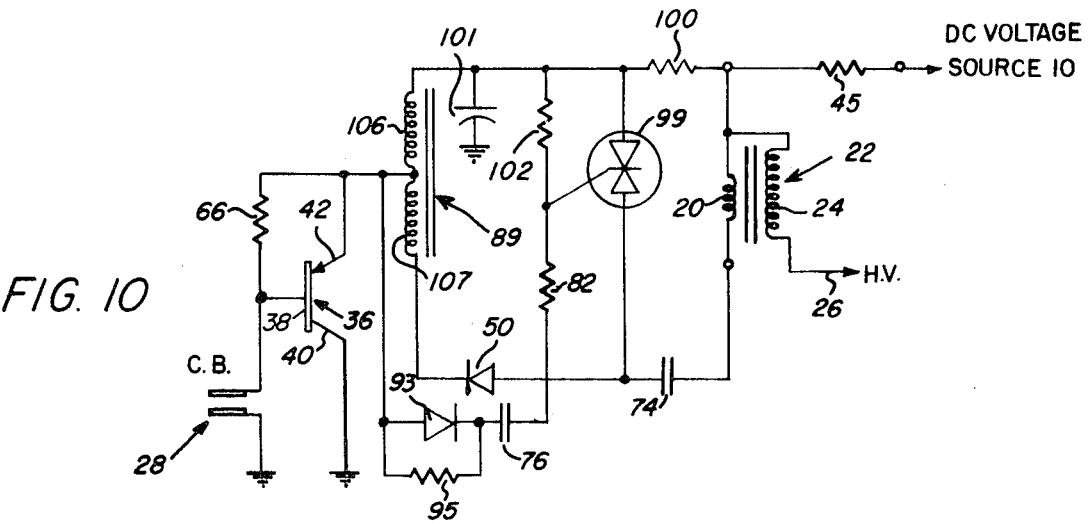
FIG. 10 is a schematic circuit diagram of the embodiment of the invention with bidirectional gating means.
Figure 11:
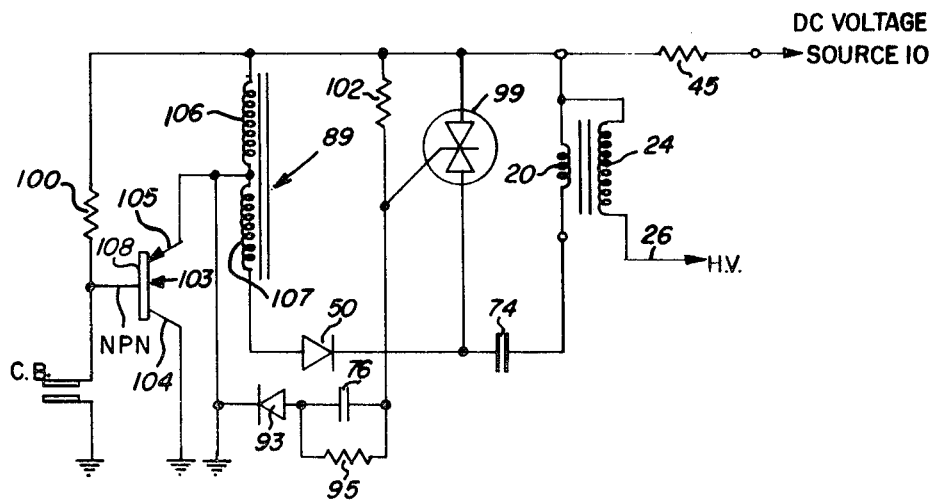
FIG. 11 is a schematic circuit diagram utilizing the contacts and NPN-transistor as a phase inverter.

FIGS. 10 and 11 explore the capabilites of the bidirectional gating type SCR 99 having the so-called "triac" characteristics. In this embodiment the storage capacitor 74 charges on contact closure by the negative pulse in view of the reversal of diode 50 from disposition in all previous embodiments. A resistor 100 may be desirable for additional current limiting while capacitor 101 bypasses resistors 45 and 100 momentarily to provide full supply voltage step-up in transformer 89.

Upon contact opening diode 93 now passes the positive pulse generated by inductive action to capacitor 76 to trigger SCR 99. Diode 93 therefore blocks the negative pulse which would have fired SCR 99 on contact closure. Resistor 95 serves the same function as that in the circuit depicted in FIG. 9, namely, antibounce protection. Additional resistor 102 provides conventional tiedown of the gate to cathode 78 of SCR 99.

FIG. 11 illustrates the use of NPN-transistor 103 having the emitter 104 grounded and collector 105 connected to top on transformer 89 having the primary 106 and secondary windings 107. Again as in FIG. 10 the SCR triac device 99 is triggered by a negative gating pulse upon contact opening since diode 50 passes the negative pulse but blocks the positive pulses. Resistor 100 connected to the base 108 drives transistor 103 on when the contacts are open to store energy which is transferred to capacitor 74 upon contact closure and transistor 103 being off. Collector 105 goes negative on the next contact closure and capacitor 76 and diode 93 pass this as a gating pulse to trigger SCR 99. The interesting point in this circuit then is its voltage conversion capability when the point contacts are closed. The combination of the NPN-transistor and inductive energy storage upon contact closure coupled with SCR triac gating then provides this result which can have wide applicability in ignition or other electronic pulse generation systems.

Many other modifications, alterations and variations may be practised in the disclosed principles of electrical high voltage pulse generation. The specific embodiments shown and described herein are therefore intended to be exemplary only of the broader aspects of the scope and tenor of the invention as defined in the appended claims.

What is claimed:

1. A contact controlled electrical transfer system comprising:
   a voltage source;
   a first circuit including serially connected to said voltage source a transformer having primary and secondary windings and a high voltage load;
   a second circuit including an inductance conductively connected in parallel to the transformer primary winding; pulse generation contact means and transistor amplifier means serially interconnected to said second circuit;
   unidirectional current control means serially connected between said parallel inductance and said transformer primary winding;
   a storage capacitor connected in parallel across said unidirectional means output;
   a controlled rectifier having a trigger pulse gate lead serially connected between said capacitor and transformer primary winding;
   said amplifier means being alternately conductive and nonconductive upon opening and closing of said pulse generation means to store energy in said first circuit when said amplifier is conductive and transfer said energy to charge said capacitor when said amplifier is nonconductive;
   means providing a trigger pulse to gate said controlled rectifier on to discharge said capacitor into said transformer primary winding and means for delaying said trigger pulse until said capacitor charge has reached a predetermined value;
   said delaying means including a capacitor serially connected between said gate lead and said amplifier means.

2. A contact controlled electrical transfer system comprising:
   a voltage source having negative and positive terminals;
   a first circuit including serially connected to said voltage source a transformer having primary and secondary windings and a high voltage load;
   a second circuit including an inductance conductively connected in parallel to the transformer primary winding;
   pulse generation contact means and transistor amplifier means serially interconnected to said second circuit;
   unidirectional current control means serially connected between parallel inductance and said transformer primary winding;
   a storage capacitor connected in parallel across the output of said unidirectional control means;

a silicon controlled rectifier having a trigger pulse gate lead serially connected between the positive terminal of said voltage source and the transformer primary winding;

said amplifier means being alternatively conductive and nonconductive upon opening and closing of said pulse generation means to store energy in said first circuit when said amplifier is conductive and transfer said energy to charge said capacitor when said amplifier is non conductive;

means providing a trigger pulse to gate said silicon controlled rectifier on to discharge said capacitor into said transformer primary winding;

and means for delaying said trigger pulse until said capacitor charge has reached a predetermined value;

said delaying means including a Zener diode device having a breakdown voltage characteristic to trigger said rectifier serially connected between said unidirectional control means and parallel inductance.

3. A contact controlled electrical transfer system comprising:

a voltage source having a negative and positive terminal;

a first circuit including serially connected to said voltage source a transformer having primary and secondary windings and a high voltage load;

a second circuit including an inductance conductively connected in parallel to the transformer primary winding;

pulse generation contact means and transistor amplifier means serially interconnected to said second circuit;

unidirectional current control means serially connected between said parallel inductance and said transformer primary a storage capacitor connected in parallel across the output of said unidirectional control means;

a silicon controlled rectifier having a trigger pulse gate lead serially connected to the positive terminal of said voltage source;

said amplifier means being alternately conductive and nonconductive upon opening and closing of said pulse generation means to store energy in said first circuit when said amplifier is conductive and transfer energy to charge said capacitor when said amplifier is nonconductive;

means providing a trigger pulse to gate said silicon rectifier on to discharge said capacitor into said transformer primary winding;

and means for delaying said trigger pulse until said capacitor charge has reached a predetermined value;

said delaying means comprising a capacitive divider subcircuit connected between said rectifier and storage capacitor, said subcircuit including a capacitor and diode in series and resistor in shunt across said diode.

4. A contact controlled electrical transfer system comprising:

a voltage source;

a first circuit including serially connected to said voltage source a transformer having primary and secondary windings and a high voltage load;

a second circuit including an inductance conductively connected in parallel to the transformer primary winding;

pulse generation contact means and transistor amplifier means serially connected to said second circuit;

unidirectional current control means serially connected between said parallel inductance and said transformer primary winding;

a storage capacitor connected in parallel across the output of said unidirectional control means;

a silicon controlled rectifier having bidirectional gating characteristics connected in parallel with said primary winding and in series with said storage capacitor to discharge said capacitor in response to a triggering pulse;

said amplifier means being alternately conductive and nonconductive upon opening and closing of said contact means to store energy in said first circuit when said amplifier is conductive and charge said capacitor;

and circuit means for gating said silicon controlled rectifier on to discharge said stored voltage through said transformer primary winding by transfer of energy from said parallel inductance when said amplifier is nonconductive.

* * * * *